(12) United States Patent
Wiegers et al.

(10) Patent No.: US 11,312,500 B2
(45) Date of Patent: Apr. 26, 2022

(54) ELECTRO-PNEUMATIC DE-ICER

(71) Applicant: Textron Aviation Inc., Wichita, KS (US)

(72) Inventors: Robert Glynn Wiegers, Wichita, KS (US); Cristopher Robert Schroeder, Clearwater, KS (US)

(73) Assignee: Textron Innovations, Inc., Providence, RI (US)

( * ) Notice: Subject to any disclaimer, the term of this patent is extended or adjusted under 35 U.S.C. 154(b) by 903 days.

(21) Appl. No.: 15/708,411

(22) Filed: Sep. 19, 2017

(65) Prior Publication Data

US 2018/0105277 A1    Apr. 19, 2018

Related U.S. Application Data

(60) Provisional application No. 62/409,561, filed on Oct. 18, 2016.

(51) Int. Cl.
*B64D 15/16* (2006.01)

(52) U.S. Cl.
CPC .................. *B64D 15/166* (2013.01)

(58) Field of Classification Search
CPC .................................. B65D 15/166
See application file for complete search history.

(56) References Cited

U.S. PATENT DOCUMENTS

| 2,249,339 A | 7/1941 | Wells et al. | |
| 2,337,426 A * | 12/1943 | Taylor | B64D 15/166 |
| | | | 244/134 A |
| 2,439,458 A | 4/1948 | Eaton | |
| 2,489,799 A * | 11/1949 | Minshall | B64D 15/166 |
| | | | 244/134 A |
| 2,515,519 A * | 7/1950 | Lawrence | B64D 15/166 |
| | | | 244/134 A |
| 3,693,916 A | 9/1972 | Tritt et al. | |
| 3,720,388 A | 3/1973 | Kaatz et al. | |
| 3,891,164 A * | 6/1975 | Hertrick | B64D 15/166 |
| | | | 244/134 A |

(Continued)

FOREIGN PATENT DOCUMENTS

WO      03053781 A1    7/2003

*Primary Examiner* — Justin M Benedik
(74) *Attorney, Agent, or Firm* — Erise IP, P.A.

(57) ABSTRACT

An electro-pneumatic de-icer for an airfoil includes an electrically-powered compressor for compressing air, an air-storage tank for storing compressed air, a source of negative pressure, an airfoil pneumatic boot, and a control valve located between 1) the air-storage tank, 2) the source of negative pressure, and 3) the pneumatic boot for cycling between compressed air to inflate the pneumatic boot and negative pressure to deflate the pneumatic boot for cracking accumulated ice on the airfoil. An airfoil de-icing method lacking engine bleed air extraction includes compressing air with an electrically-powered compressor, storing high-pressure air from the compressor in an air-storage tank, delivering high-pressure air from the air-storage tank to inflate a pneumatic boot located along an airfoil, providing a negative-pressure source, deflating the pneumatic boot with the negative-pressure source, and alternating between inflating and deflating the pneumatic boot for cracking accumulated ice on the airfoil.

17 Claims, 8 Drawing Sheets

(56) References Cited

U.S. PATENT DOCUMENTS

| | | | |
|---|---|---|---|
| 5,035,380 A | 7/1991 | Weisend, Jr. et al. | |
| 5,112,011 A * | 5/1992 | Weisend, Jr. | B64D 15/166 |
| | | | 244/134 A |
| 5,248,116 A * | 9/1993 | Rauckhorst | B64D 15/166 |
| | | | 244/134 A |
| 5,393,014 A * | 2/1995 | Weisend, Jr. | B64D 15/166 |
| | | | 137/625.21 |
| 7,789,102 B2 * | 9/2010 | Beckman | F04B 49/20 |
| | | | 137/492.5 |
| 2003/0122037 A1 * | 7/2003 | Hyde | B64D 15/166 |
| | | | 244/134 A |
| 2016/0009400 A1 | 1/2016 | English et al. | |

* cited by examiner

ELECTRO-PNEUMATIC DE-ICER

CROSS-REFERENCE TO RELATED APPLICATIONS

This application claims the benefit of U.S. Provisional Application No. 62/409,561 entitled "Electro-Pneumatic De-Icer" filed on Oct. 18, 2016, which is herein incorporated by reference in its entirety.

BACKGROUND

1. Field

Embodiments of this disclosure relate generally to removal of ice from aircraft, and more specifically to a system using an inflatable bladder for cracking ice on an airfoil.

2. Description of Related Art

International Patent Publication WO 03/053781 to Hyde et al. discloses a reservoir for providing pressurized inflation fluid and a line for providing deflation suction from an airfoil's low pressure side. The pressurized reservoir may be charged pre-flight.

U.S. Pat. No. 3,693,916 to Tritt et al. discloses a valve mechanism for de-ice removal that uses high-pressure air provided from an air pump or other fluid pressure source.

European Patent Publication EP0539723 to Hlavac et al. discloses a control system including a controller valve and an ejector valve for inflation and deflation of de-icer bladders using unregulated turbine bleed air.

U.S. Pat. No. 5,035,380 to Weisend et al. and U.S. Pat. No. 3,720,388 to Kaatz et al. both disclose a de-ice system that uses pressurized air from a bleed-off of a turbine engine.

SUMMARY

In an embodiment, an electro-pneumatic de-icer for an airfoil is provided. The electro-pneumatic de-icer includes an electrically-powered compressor for compressing air; an air-storage tank fluidly coupled to the compressor for storing compressed air; an electrically-powered vacuum pump for producing negative pressure; a pneumatic boot coupled to the airfoil; and, a three-way control valve fluidly coupled between the air-storage tank, the vacuum pump, and the pneumatic boot for cycling between a supply of compressed air from the air-storage tank to inflate the pneumatic boot and a supply of negative pressure from the vacuum pump to deflate the pneumatic boot for cracking accumulated ice on the airfoil.

In another embodiment, an airfoil de-icing system is provided. The system includes an electrically-powered compressor for compressing air; a pressurized vessel having an intake coupled to the compressor for receiving and storing compressed air and an exit port for providing high-pressure air; a source of negative pressure; an airfoil pneumatic boot; and, a three-way valve located between 1) the exit port of the pressurized vessel, 2) the source of negative pressure, and 3) the airfoil pneumatic boot, wherein the three-way valve alternates supply of negative pressure with supply of high-pressure air to the airfoil pneumatic boot, thereby cyclically deflating and inflating the airfoil pneumatic boot for cracking accumulated ice on the airfoil.

In yet another embodiment, an airfoil de-icing method is provided. The method includes compressing air with an electrically-powered compressor; storing high-pressure air from the compressor in an air-storage tank; delivering high-pressure air from the air-storage tank to a pneumatic boot located along an airfoil to inflate the pneumatic boot; providing a negative-pressure source; deflating the pneumatic boot with the negative-pressure source; and, alternating cyclically between inflating and deflating the pneumatic boot for cracking accumulated ice on the airfoil.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

On aircraft certified for flying into known icing conditions, airfoil ice protection is typically accomplished by thermal heating of the airfoil (e.g., anti-icing) or physical cracking of accumulated ice followed by removal of cracked ice from air resistance (e.g., de-icing). Thermal energy needed for anti-icing is traditionally provided using hot engine bleed air. Physical cracking of accumulated ice for de-icing is typically accomplished by repeatedly inflating and deflating an elastomeric boot coupled to the airfoil. Faster inflation/deflation rates typically increase the effectiveness of ice cracking, leading to a cleaner airfoil. Pneumatic pressure needed to inflate the boot is traditionally provided using engine bleed air. To generate a vacuum, engine bleed air is dumped overboard, typically through a venturi configured as an ejector. A valve may be used to switch flow of engine bleed air between 1) inflating the boot and 2) passing through the ejector to deflate the boot. Once ice is removed from the airfoil, the vacuum is used to pull the boot against the airfoil to reduce drag.

Continual engine bleed air extraction results in increased engine Specific Fuel Consumption (SFC) and reduced aircraft range. During the inflation cycle there is a sudden rush of air from the engine to the pneumatic boots, which the engine must be designed to handle. This results in a less optimum engine design (e.g., increased engine component sizes may be needed), decreases overall efficiency, and reduces instantaneous thrust during the pneumatic boot inflation cycle. Small jet and turboprop aircraft have limited engine bleed air available and an increased sensitivity to engine bleed air extraction. Piston-type aircraft do not have bleed air available, limiting their options for ice protection.

Embodiments of the present disclosure provide an electric motor to power a compressor for storing high-pressure air to rapidly inflate a de-ice bladder and to power a vacuum pump to deflate the bladder. This eliminates the engine as the means of producing pneumatic vacuum and pressure. Instead, energy from the engine is used to generate electricity from an electric generator, and pneumatic vacuum and pressure are powered by an electric motor that receives electricity from the electric generator. Existing aircraft equipped with pneumatic boots may be retrofitted to use embodiments of the present disclosure.

Figure 1:
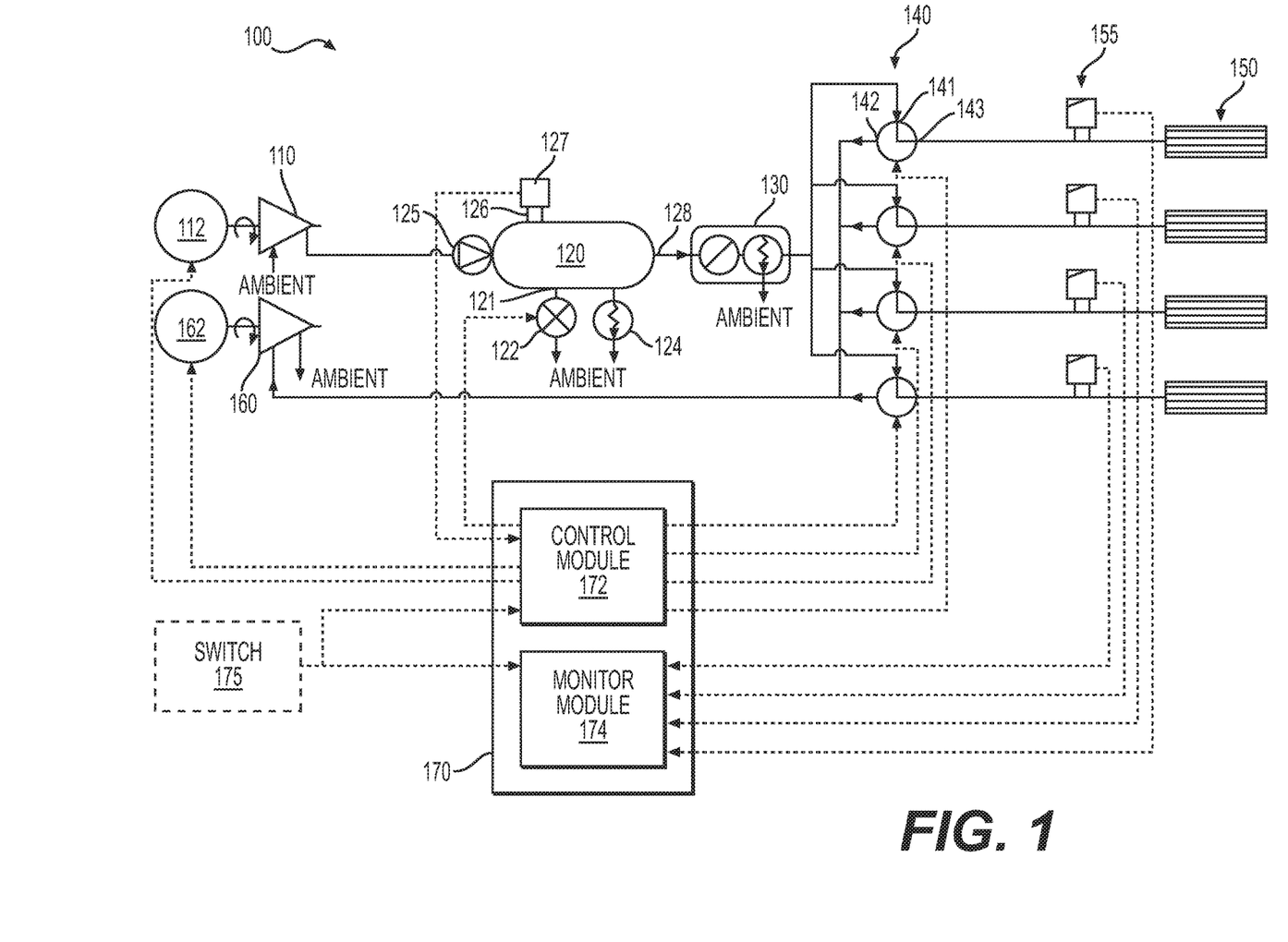
FIG. 1 is a block diagram of an electro-pneumatic de-icer, in an embodiment.
Figure 2:
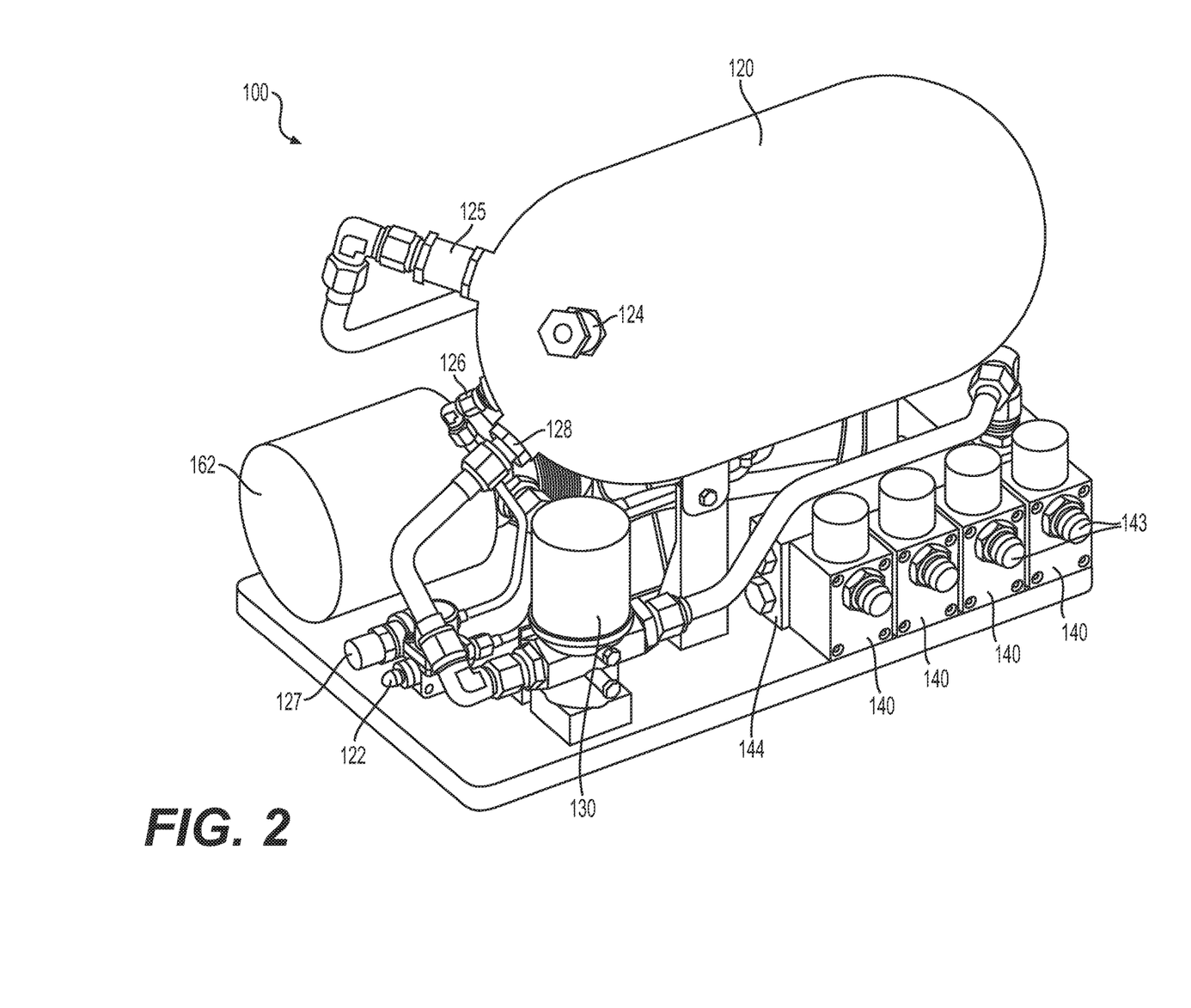
FIG. 2 is a perspective view of the electro-pneumatic de-icer of FIG. 1.
Figure 3:
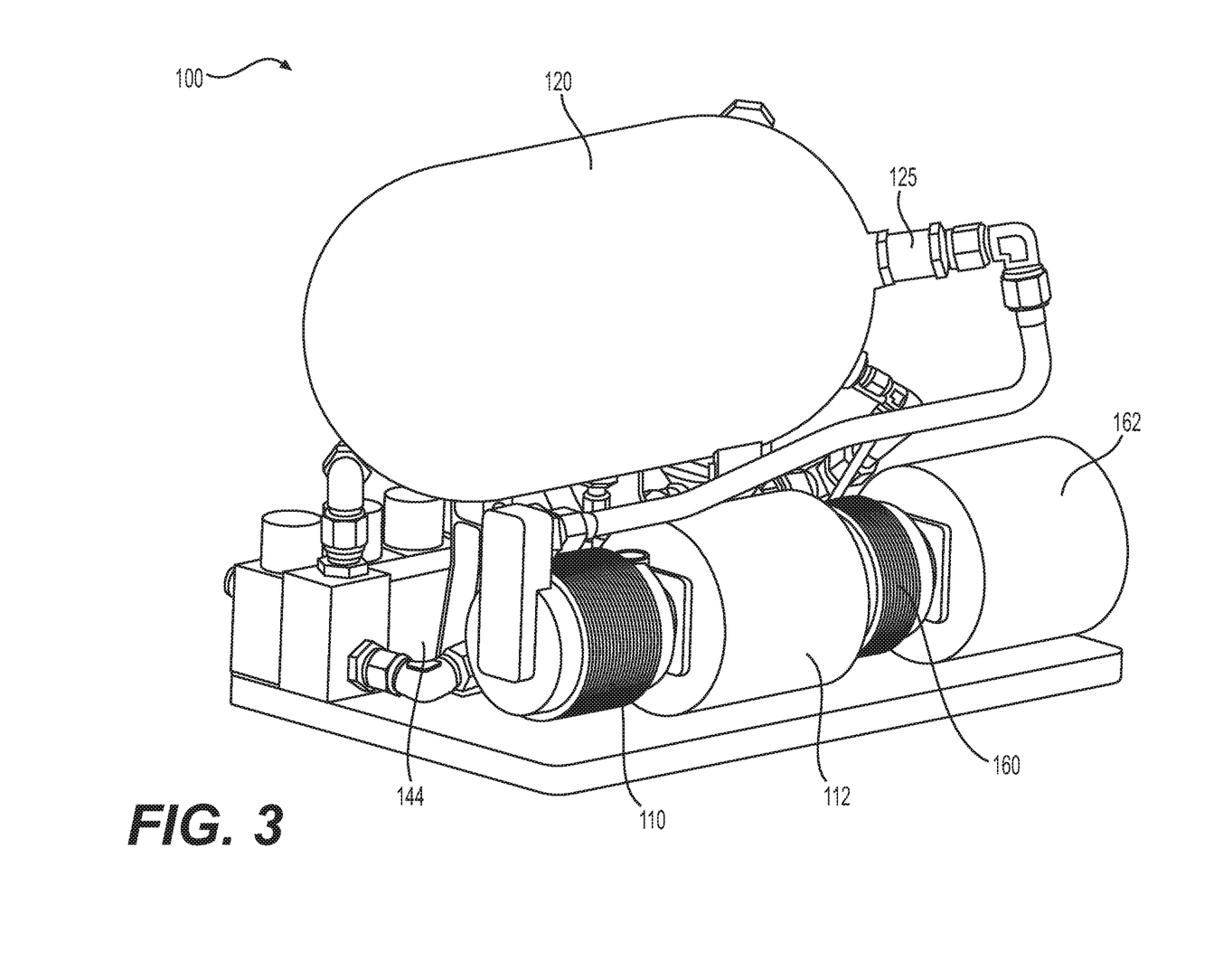
FIG. 3 is another perspective view of the electro-pneumatic de-icer of FIG. 1.

FIG. 1 is a block diagram of an exemplary electro-pneumatic de-icer 100. FIGS. 2 and 3 show perspective views of some components of de-icer 100. Components enumerated in different figures with like numerals are the same. FIGS. 1-3 are best viewed together with the following description.

De-icer 100 uses an electric generator to convert mechanical energy from an aircraft's engine to electricity. The electricity is used to power a compressor 110 via a first electric motor 112 and a vacuum pump 160 via a second electric motor 162. Compressor 110 is configured to receive ambient air and compress it to supply high-pressure air to an accumulator 120. Accumulator 120 is, for example, a hollow chamber, air-storage tank, or pressurized vessel configured to accumulate and store air under high pressure. The volume of accumulator 120 is sized to provide sufficient high pressure fluid to rapidly inflate and deflate one or more pneumatic boots 150. In an embodiment, accumulator 120 has a volume of about 0.5 cubic feet. Pressurized air from compressor 110 passes through a check valve 125, which may for example be a poppet-style valve that is spring loaded in a closed position, to ensure that pressure from accumulator 120 does not backflow when compressor 110 is not operating.

Accumulator 120 may include a drain port 121, a relief valve 124, a pressure sensor port 126, and a pressurized air exit port 128. Drain port 121 may be fluidly coupled with a drain valve 122 for draining accumulator 120. Drain valve 122 may be biased to an open position (e.g., using a spring) and electrically powered to a closed position (e.g., using a solenoid), such that when unpowered, drain valve 122 is automatically biased open to allow stored compressed air and moisture to drain to ambient pressure (e.g., overboard).

Relief valve 124 prevents over-pressurization of accumulator 120. An example of relief valve 124 is a spring-loaded poppet-style valve that opens at a predetermined pressure above a normal operating pressure of compressor 110. Relief valve 124 automatically opens when pressure in accumulator 120 exceeds the predetermined pressure and closes when the pressure decreases below the predetermined pressure. Relief valve vents the excess pressure to ambient pressure (e.g., overboard).

Pressure sensor port 126 allows for a pressure sensor 127 to measure gauge pressure in accumulator 120. In some embodiments, air pressure of accumulator 120 is a gauge-pressure in pounds-per-square-inch (psig) within a range of about 100 psig to about 200 psig. In certain embodiments, accumulator 120 gauge-pressure is in a range of about 125 psig to about 150 psig. Pressure sensor 127 is for example a pressure transducer or switch electrically coupled to a controller 170. Data from pressure sensor 127 is processed by a control module 172 of controller 170, as described below in connection with FIG. 4, and used for determining when to turn compressor 110 on or off. Additionally, pressure transducers 155 may be coupled to de-icer 100, e.g., to the pneumatic boots 150 or to the hoses or lines that fluidly couple to the pneumatic boots 150, for transmitting pressure information to a monitor module 174 of controller 170, as described below in connection with FIG. 4. A switch 175 may be communicatively coupled to a controller 170 to enable a user to turn de-icing on or off.

Pressurized air exit port 128 supplies air to a pressure regulator 130, which may reduce air pressure to a desired level for proper pneumatic boot inflation. For example, the desired level for air pressure may be in the range of about 10 psig to about 30 psig, or more specifically in the range of 15 psig to 25 psig. In certain embodiments, the air pressure level is within the range of 16 psig to 23 psig. Pressure regulator 130 is for example a pressure-regulated manifold that supplies pressure-regulated air to one or more control valves 140 and may further include a relief component to limit downstream pressure to a safe level in the event of a regulator failure.

Pressure regulator 130 may supply pressure-regulated air to one of control valves 140, which are used to switch between negative pressure (e.g., vacuum) and pressurized air supplied to pneumatic boots 150. Each of control valves 140 is for example a three-way electrically-powered and pneumatically operated valve, having a first port 141 for supplying pressure-regulated air from pressure regulator 130, a second port 142 coupled to the source of negative pressure (e.g., vacuum pump 160), and a third port 143 fluidly coupled to a respective one of pneumatic boots 150. Control valves 140 are configured to switch between first port 141 and second port 142 for switching between supply of pressurized air and withdrawal of pressurized air via supply of vacuum, respectively. In an embodiment, accumulator 120 delivers pressurized air to a plurality of pneumatic boots 150 via a plurality of respective control valves 140. In certain embodiments, the control valves 140 are independent valves that are fluidly coupled via a manifold 144 to first port 141 and second port 142. To inflate pneumatic boots 150, control valves 140 are powered and instructed by controller 170 to open first port 141 while closing second port 142. To deflate pneumatic boots 150, control valves 140 are powered and instructed by controller 170 to open second port 142 while closing first port 141.

Vacuum pump 160 is electrically-powered and configured to supply negative pressure to a plurality of pneumatic boots 150 via respective control valves 140. Specifically, vacuum pump 160 expels ambient air to produce a vacuum and supplies the resulting negative pressure to second port 142, which is coupled to manifold 144 for distributing to control valves 140. When unpowered, control valves 140 provide negative pressure to pneumatic boots 150, thereby pulling boots 150 against the airfoil surface to decrease airfoil drag.

Figure 4:
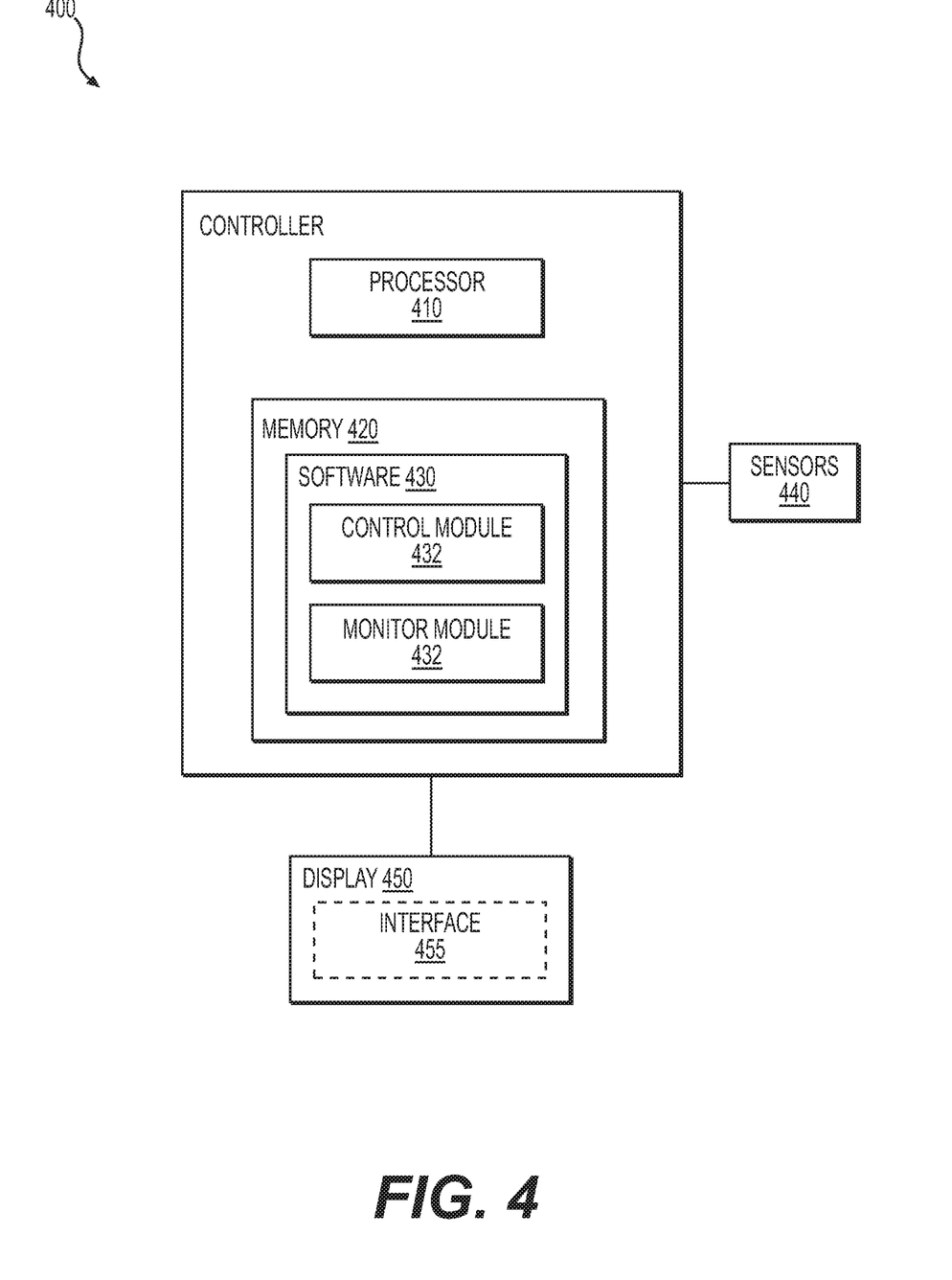
FIG. 4 is a block diagram of a controller used to monitor and control an electro-pneumatic de-icer, in an embodiment.

FIG. 4 is a block diagram of an exemplary controller 400 used to monitor and control an electro-pneumatic de-icer, such as de-icer 100, FIG. 1. Controller 400 is an example of controller 170, FIG. 1 and includes a memory 420 for storing software 430 having machine readable instructions executed by a processor 410. Controller 400 is for example one or more of a computer, a microcontroller, a programmable logic controller (PLC), and a programmable automation controller, coupled with control circuitry, such as one or more printed circuit boards for example.

Controller 400 may be located onboard the aircraft and coupled to one or more sensors 440 via a two-way communication path, which may include one or both of a wired and/or a wireless communication media. Examples of sensors 440 include pressure sensor 127 and pressure transducers 155. Memory 420 in some embodiments is a memory system that includes both transitory memory such as RAM and non-transitory memory such as, ROM, EEPROM, Flash-EEPROM, magnetic media including disk drives, and optical media. Memory 420 stores software 430 as machine readable instructions executable by processor 410 to control de-icer 100. Software 430 may provide instructions to process data from sensors 440 for example. Exemplary instructions may include a control module 432, for controlling components of de-icer 100, and a monitor module 434 for processing data from sensors 440. For example, control module 432 transmits commands to turn on or off compressor 110, vacuum pump 160, an optional electric clutch (see e.g., FIG. 6, described below), and an optional unloading valve (see e.g., FIGS. 7 and 8, described below). Control module 432 may also provide commands to open or close drain valve 122, to actuate control valves 140, and to monitor pressure in accumulator 120 via at least one of sensors 440. Monitor module 434 monitors one or more of sensors 440 (e.g., the pneumatic boot supply pressure transducers 155) and returns system faults. Controller 400 may be coupled to a display 450 for displaying information about de-icer 100, such as pressure information from sensors 440. Display 450 may optionally include an interface 455 for enabling a user to provide input. Alternatively, switch 175 may be used to simply turn de-icing on or off.

In operation, de-icer 100 uses electrical power provided by an engine mounted generator to supply positive pressure via compressor 110 to inflate pneumatic boots 150 and negative pressure via vacuum pump 160 to deflate boots 150. Using control valves 140, pressure supplied to boots 150 is alternated between positive pressure and negative pressure in a cyclic manner, as further described below in connection with method 500, FIG. 5.

Figure 5:
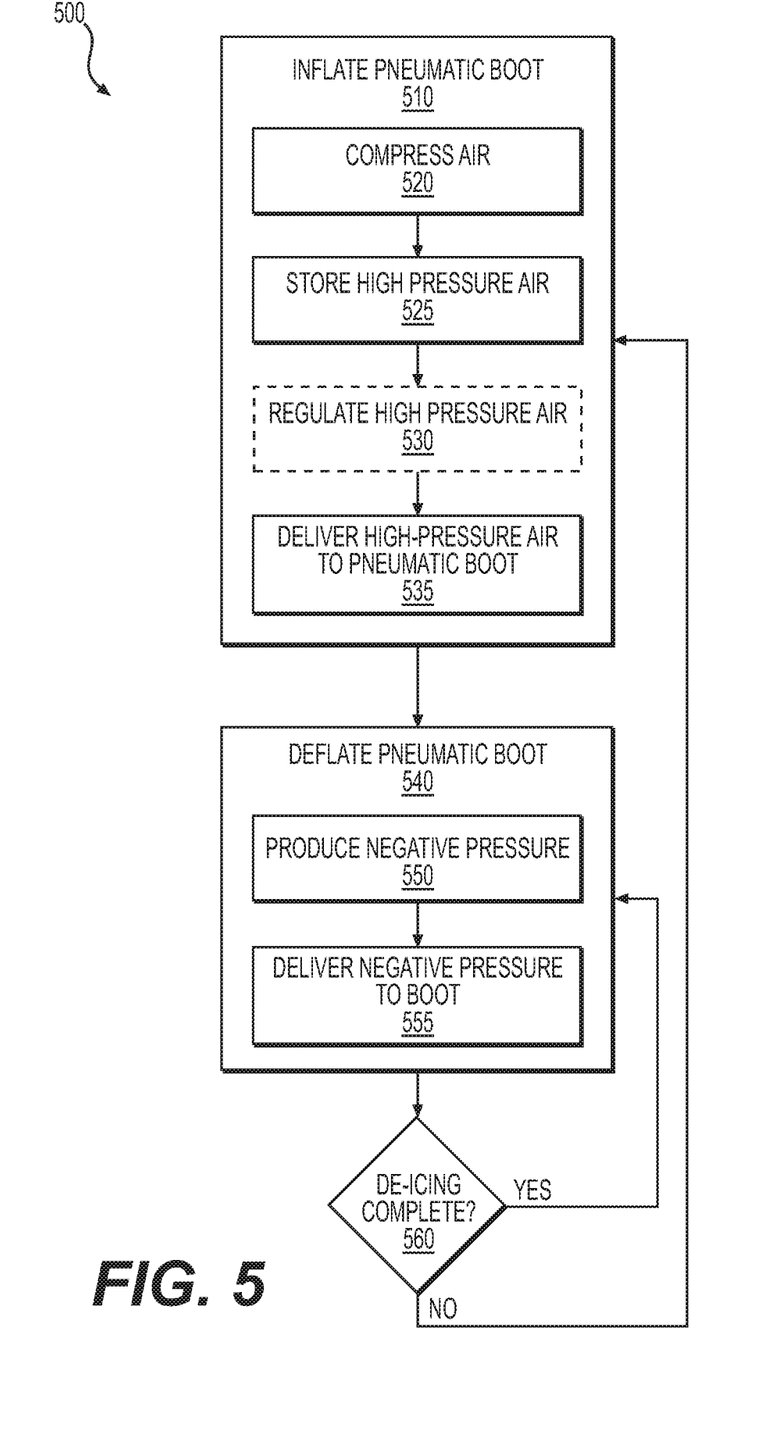
FIG. 5 is a flow diagram showing steps of a method for de-icing an airfoil using an electro-pneumatic de-icer, in an embodiment.

FIG. 5 is a flow diagram showing steps of an exemplary method 500 for de-icing an airfoil using an electro-pneumatic de-icer, such as de-icer 100, FIG. 1. Alternate embodiments of the electro-pneumatic de-icer are capable of performing method 500, as described below in connection with FIGS. 6-8. Note that rather than using engine bleed air to inflate or deflate pneumatic boots, method 500 uses alternate means to inflate and deflate the boots based on the various de-icer embodiments.

In a step 510, the pneumatic boot is inflated. In an example of step 510, pneumatic boots 150, FIG. 1 are inflated. Step 510 relies upon steps 520 to 535, described below, in order to prepare and deliver pressure-regulated air for properly inflating pneumatic boots 150. If control valves 140 are commanded to inflate pneumatic boots 150 and the pressure values from pressure transducers 155 are outside an acceptable range, controller 400 may generate a fault and display an error message via display 450 for example.

In a step 520, an electric motor drives a high capacity compressor to compress air for producing pressurized (e.g., high-pressure) air. In an example of step 520, electric motor 112, FIG. 1 drives compressor 110 to produce pressurized air. Compressor 110 may operate intermittently to supply pressurized air when the pressure in accumulator 120 drops below a predetermined level. In the embodiment shown in FIG. 1, de-icer 100 operates compressor 110 intermittently by turning first electric motor 112 on and off via controller 170. In the embodiment shown in FIG. 6, described below, de-icer 600 operates a compressor 610 intermittently by engaging/disengaging a shaft coupled to an electric motor 612 via an electric clutch 680 under control of controller 170. In the embodiments shown in FIGS. 7 and 8, described below, de-icers 700 and 800 use an unloading valve 785 to intermittently vent high-pressure air from compressor 610 under control of controller 170.

In a step 525, high-pressure air is stored. In an example of step 525, accumulator 120 stores high-pressure air above a predetermined level and releases air through relief valve 124 if the pressure exceeds the predetermined level (e.g., an unsafe level). In some embodiments, a predetermined range of high-pressure air stored in accumulator 120 is a gauge-pressure of about 100 psig to about 200 psig. In certain embodiments, the predetermined range of high-pressure air stored in accumulator 120 is a gauge-pressure of about 125 psig to about 150 psig.

In an optional step 530, the pressure regulator regulates the high-pressure air to a predetermined range or set point. In an example of step 530, pressure regulator 130 lowers the air pressure exiting accumulator 120 to a set point within a predetermined range. The predetermined range of the air pressure exiting accumulator 120 is from about 10 psig to about 30 psig. In certain embodiments, the predetermined range is from about 15 psig to about 25 psig. In other embodiments, the predetermined range is from about 18 psig to about 20 psig.

In a step 535, the high-pressure air is delivered to the pneumatic boot. In an example of step 535, control valves 140 are powered and instructed by controller 170 to open first port 141 while closing second port 142, which directs high-pressure air from pressure regulator 130 to inflate pneumatic boots 150.

In a step 540, the pneumatic boot is deflated. In an example of step 540, pneumatic boots 150 are deflated. Step 540 relies upon steps 550 and 555 in order to prepare and deliver negative pressure for deflating pneumatic boots 150.

In a step 550, negative pressure is produced. In an example of step 550, electric motor 162 drives vacuum pump 160, FIG. 1 to produce negative pressure. Vacuum pump 160 may operate continuously to provide a constant source of negative pressure to deflate pneumatic boots 150 and pull them against the airfoil (e.g., when de-icing is not being performed). In another example of step 550, the intake to compressor 110 is configured to operate at a negative pressure, which is used to deflate pneumatic boots 150 without the need for a vacuum pump (e.g., see FIG. 8 and related description below).

In a step 555, negative pressure is delivered to the pneumatic boot. In an example of step 555, control valves 140 are powered and instructed by controller 170 to open second port 142 while closing first port 141, thereby exposing pneumatic boots 150 to negative pressure provided in step 550 for withdrawing air from pneumatic boots 150.

A step 560 is a decision. If in step 560, the de-icing is complete, method 500 returns to step 540 to maintain deflation of the pneumatic boot for reducing airfoil drag. Otherwise, method 500 returns to step 510 to re-inflate the pneumatic boot. By returning to step 510, method 500 begins another inflation/deflation cycle. The decision in step 560 may be based on a predetermined number of inflation/deflation cycles, or it may be based, at least partially, on feedback information that indicates an amount of ice cracking or ice removal. In certain embodiments, the pilot determines the amount of ice cracking and removal by visual inspection.

Figure 6:
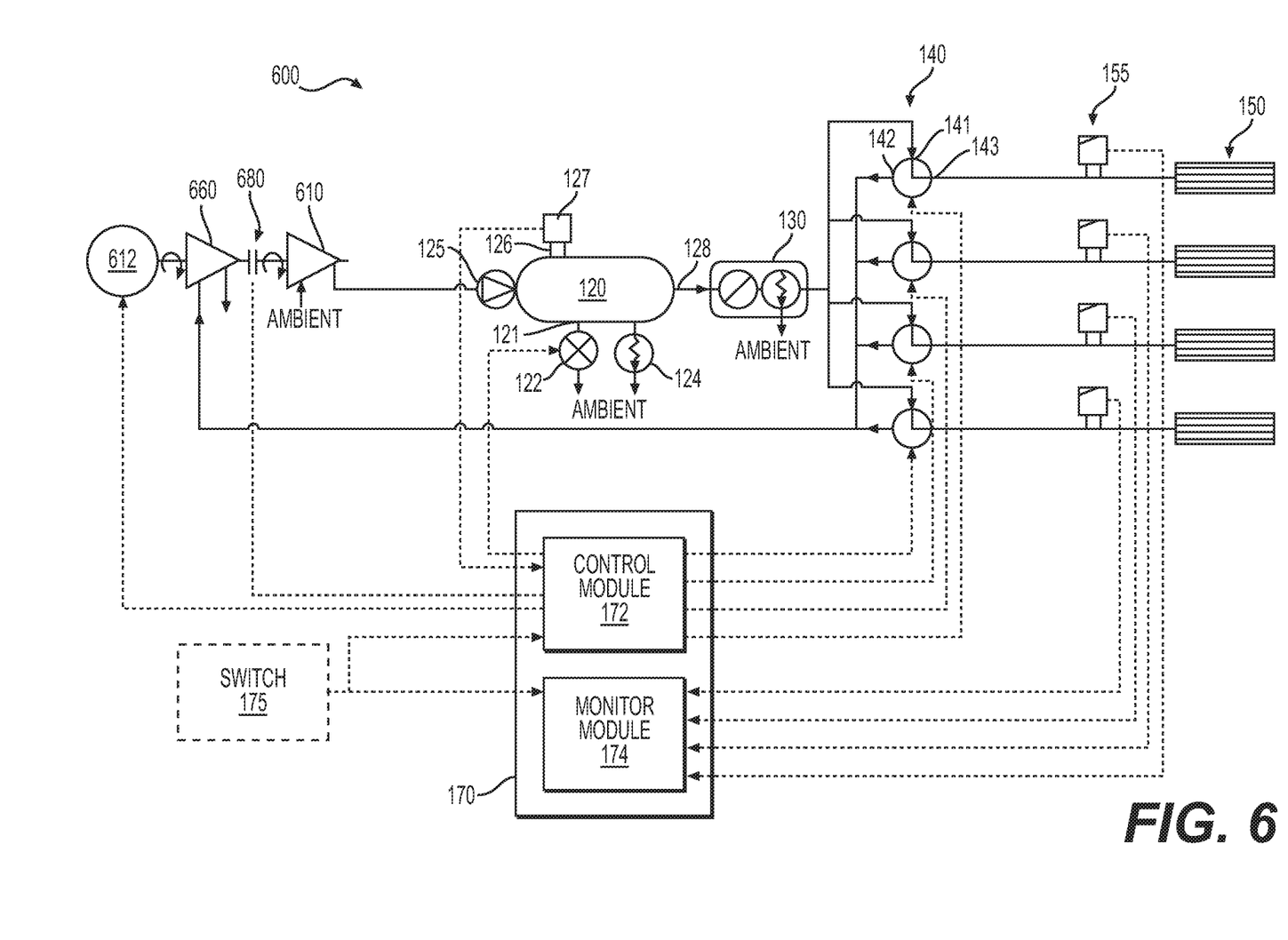
FIG. 6 is a block diagram of an alternative embodiment of an electro-pneumatic de-icer.

FIG. 6 is a block diagram of an exemplary electro-pneumatic de-icer 600. De-icer 600 is an alternative embodiment of de-icer 100, FIG. 1 configured with a single electric motor 612 that includes a common shaft to drive both a low capacity vacuum pump 660 and a high-capacity compressor 610. Electric motor 612 drives low-capacity vacuum pump 660 continually to ensure there's a constant source of vacuum to fully deflate pneumatic boots 150. An electric clutch 680 is provided to intermittently drive compressor 610 under control of controller 170 to supply pressurized air to accumulator 120.

Figure 7:
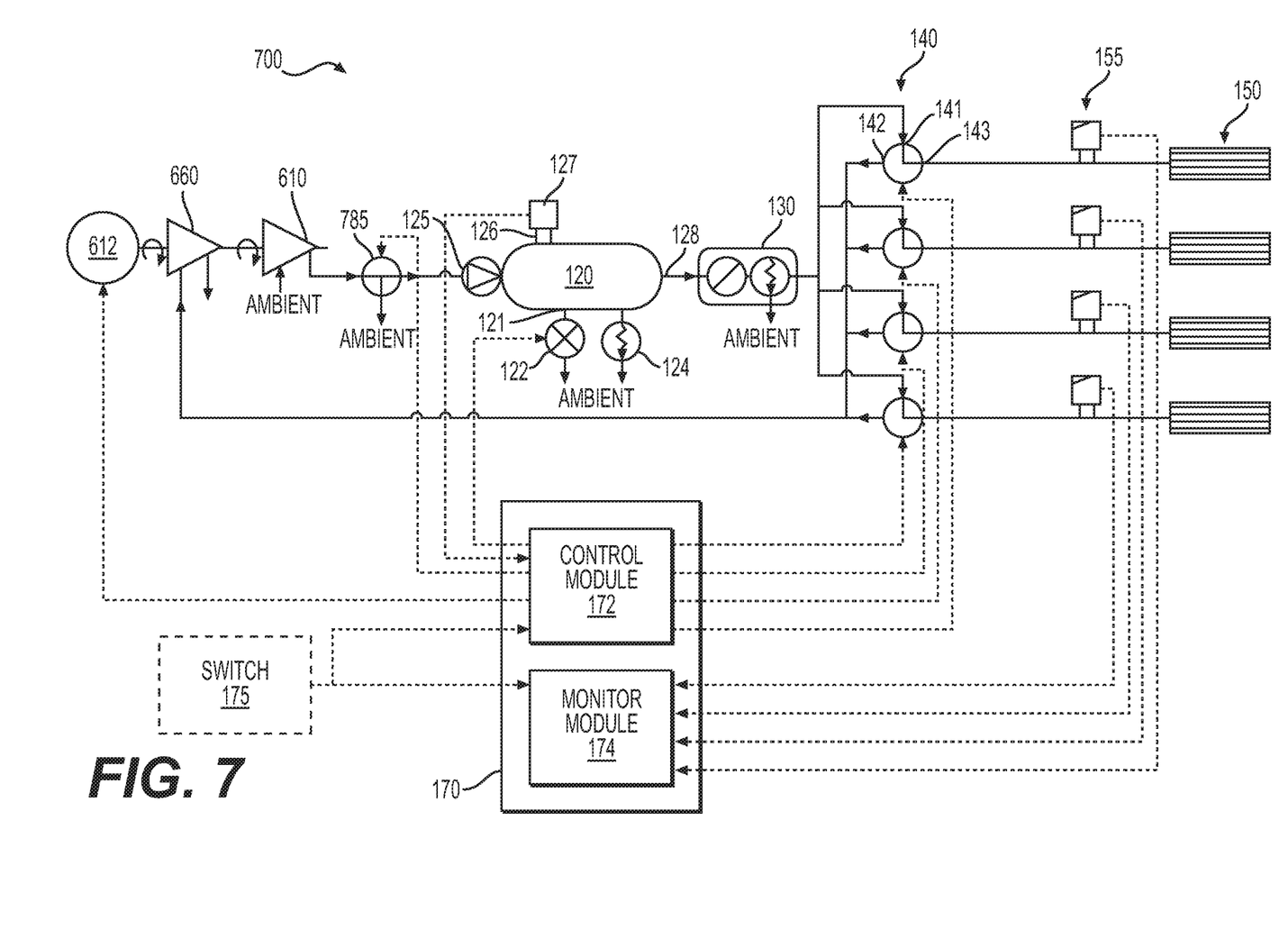
FIG. 7 is a block diagram of another alternative embodiment of an electro-pneumatic de-icer.

FIG. 7 is a block diagram of an exemplary electro-pneumatic de-icer 700. De-icer 700 is an alternative embodiment of de-icer 100, FIG. 1 configured with a single electric motor 612 that includes a common shaft to drive both low-capacity vacuum pump 660 and high-capacity compressor 610, but rather than providing electric clutch 680 to intermittently drive compressor 610 to supply pressurized air as with de-icer 600, FIG. 6, compressor 610 instead runs continuously and the outlet of compressor 610 includes an unloading valve 785. Unloading valve 785 may be closed intermittently to supply pressurized air and opened to vent air overboard when pressure of accumulator 120 reaches a predetermined level. Unloading valve 785 may be biased open, via a spring for example, and electrically powered to close under control of controller 170.

Figure 8:
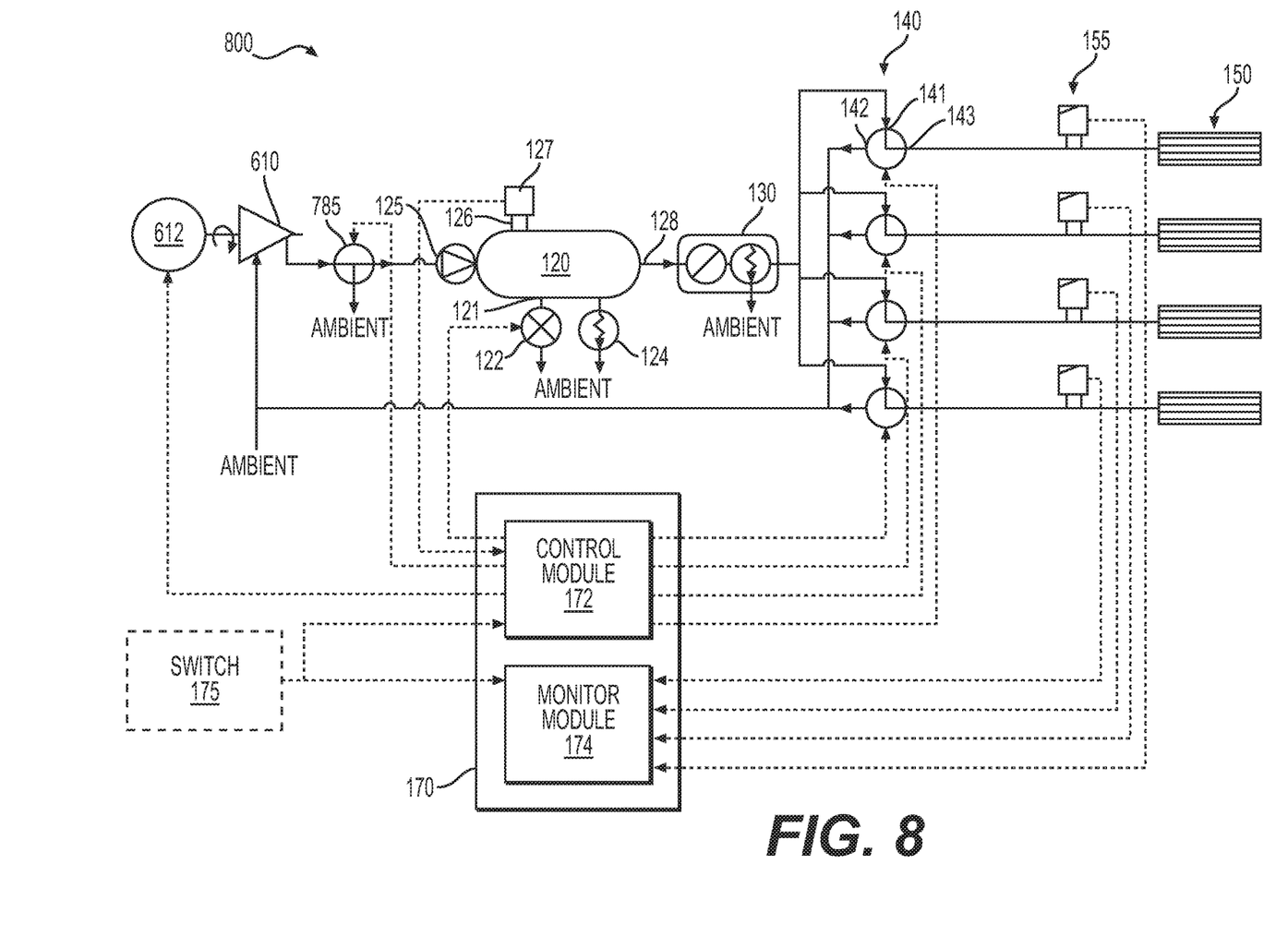
FIG. 8 is a block diagram of a yet another alternative embodiment of an electro-pneumatic de-icer.

FIG. 8 is a block diagram of an exemplary electro-pneumatic de-icer 800. De-icer 800 is an alternative embodiment of de-icer 100, FIG. 1 configured with single electric motor 612 that drives high capacity compressor 610 that continually supplies pressurized air to accumulator 120. The intake to compressor 610 operates at negative pressure. The negative pressure is used to deflate pneumatic boots 150 without the need for a vacuum pump. Unloading valve 785, under control of controller 170, is actuated to vent outlet air from compressor 610 overboard when pressure from accumulator 120 reaches a predetermined level.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

We claim:

1. An electro-pneumatic de-icer for an airfoil, comprising:
an electric generator configured to convert mechanical energy from an engine to electricity;
a first electric motor configured to electrically power a compressor for compressing air;
an air-storage tank fluidly coupled to the compressor for storing compressed air;
a pressure regulator for regulating the pressure of the compressed air exiting the air-storage tank to provide a regulated high-pressure air;
a second electric motor configured to electrically power a vacuum pump for producing negative pressure;
a plurality of pneumatic boots coupled to the airfoil;
a plurality of control valves each fluidly coupled with the plurality of pneumatic boots, respectively;
a manifold configured to fluidly couple the pressure regulator and the vacuum pump with the plurality of control valves for simultaneous operation of the control valves; and
wherein each of the plurality of control valves includes a first port fluidly coupled to the pressure regulator via the manifold, a second port fluidly coupled to the vacuum pump via the manifold, and a third port fluidly coupled to a respective one of the plurality of pneumatic boots, wherein each of the control valves is configured to cycle between supplying regulated high-pressure air through the first port to inflate a respective one of the pneumatic boots and withdrawing air through the second port to deflate a respective one of the pneumatic boots for cracking accumulated ice on the airfoil.

2. The electro-pneumatic de-icer of claim 1, wherein the compressor and vacuum pump are electrically powered by an electric motor having a common shaft therebetween.

3. The electro-pneumatic de-icer of claim 2, wherein the common shaft further comprises an electric clutch for intermittently engaging and powering the compressor to compress air for storing in the air-storage tank.

4. The electro-pneumatic de-icer of claim 1, further comprising an unloading valve fluidly coupled to an outlet of the compressor for venting excess compressed air from the compressor such that the compressor operates continuously.

5. The electro-pneumatic de-icer of claim 4, wherein the unloading valve comprises a spring for biasing the unloading valve open for venting excess compressed air, and the unloading valve is intermittently electrically powered to close for supplying high-pressure air to the air-storage tank.

6. The electro-pneumatic de-icer of claim 1, wherein the regulated high-pressure air is between 10 psig and 30 psig.

7. An airfoil de-icing system, comprising:
an electrically-powered compressor for compressing air;
a pressurized vessel having an intake coupled to the compressor for receiving and storing compressed air and an exit port for providing high-pressure air;
a controller configured to intermittently turn the electrically-powered compressor on and off for avoiding over-pressurization of the pressurized vessel;
an electrically-powered vacuum pump configured to operate continuously for providing a constant source of negative pressure;
a plurality of airfoil pneumatic boots;
a plurality of three-way valves located between 1) the exit port of the pressurized vessel, 2) the electrically-powered vacuum pump, and 3) the plurality of airfoil pneumatic boots, wherein each of the plurality of three-way valves is configured to alternate supply of negative pressure with supply of high-pressure air to a respective one of the plurality of airfoil pneumatic boots, thereby cyclically deflating and inflating the each airfoil pneumatic boot for cracking accumulated ice on the airfoil; and
a manifold configured to fluidly couple the pressurized vessel and the vacuum pump with the plurality of three-way valves such that the plurality of airfoil pneumatic boots are capable of being simultaneously inflated and deflated.

8. The airfoil de-icing system of claim 7, wherein the source of negative pressure is substantially derived from the intake to the compressor.

9. The airfoil de-icing system of claim 7, further comprising:
an electric motor having a common shaft mechanically coupled to the compressor and the vacuum pump; and
an electric clutch mechanically coupled to the common shaft for intermittently powering the compressor.

10. The airfoil de-icing system of claim 7, wherein the high-pressure air is pressurized to a gauge-pressure of more than 125 psig and less than 150 psig.

11. An airfoil de-icing method, comprising:
compressing air with an electrically-powered compressor;

storing high-pressure air from the compressor in an air-storage tank;

regulating the high-pressure air from the accumulator using a regulator for providing a regulated high-pressure air;

delivering the regulated high-pressure air from the air-storage tank via a manifold to a plurality of pneumatic boots located along an airfoil to inflate the plurality of pneumatic boots simultaneously;

providing a negative-pressure source;

deflating the plurality of pneumatic boots with the negative-pressure source via the manifold; and controlling a plurality of control valves for alternating cyclically between inflating and deflating the plurality of pneumatic boots, respectively, for cracking accumulated ice on the airfoil.

12. The airfoil de-icing method of claim 11, wherein compressing air is performed by intermittently providing power to the electrically-powered compressor for supplying high-pressure air to the air-storage tank when the pressure in the air-storage tank drops below a predetermined level.

13. The airfoil de-icing method of claim 11, wherein an electric clutch is used for intermittently providing power from a shaft of an electric motor to the compressor for supplying high-pressure air to the air-storage tank.

14. The airfoil de-icing method of claim 11, wherein the compressor operates continuously and an unloading valve is used for intermittently venting air when pressure in the air-storage tank reaches a predetermined level.

15. The airfoil de-icing method of claim 11, wherein an electric motor is used for driving a vacuum pump continually for providing a constant negative-pressure source for deflating the plurality of pneumatic boots.

16. The airfoil de-icing method of claim 11, wherein an intake to the compressor is configured for operating at a negative pressure for providing a negative-pressure source without the need for a vacuum pump.

17. The airfoil de-icing method of claim 11, wherein the plurality of control valves are commanded to inflate and deflate the plurality of pneumatic boots simultaneously.

* * * * *